June 24, 1958 J. M. PHILLIPS Re. 24,493

PALLET WITH A COLLAPSIBLE CONTAINER

Original Filed Feb. 7, 1951 5 Sheets-Sheet 1

INVENTOR.
James M. Phillips.
BY
Christy, Parmelee and Strickland
ATTORNEYS.

PALLET WITH A COLLAPSIBLE CONTAINER

Original Filed Feb. 7, 1951 5 Sheets-Sheet 2

INVENTOR.
James M. Phillips.
BY
Christy, Parmelee and Strickland
ATTORNEYS.

PALLET WITH A COLLAPSIBLE CONTAINER

Original Filed Feb. 7, 1951 5 Sheets-Sheet 3

INVENTOR.
James M. Phillips.
BY
Christy, Parmelee and Strickland
ATTORNEYS.

PALLET WITH A COLLAPSIBLE CONTAINER

Original Filed Feb. 7, 1951 5 Sheets-Sheet 4

INVENTOR.
James M. Phillips.
BY
Christy, Parmelee and Strickland
ATTORNEYS.

PALLET WITH A COLLAPSIBLE CONTAINER

Original Filed Feb. 7, 1951 5 Sheets-Sheet 5

INVENTOR.
James M. Phillips.
BY
Christy, Parmelee and Strickland.
ATTORNEYS.

United States Patent Office

Re. 24,493
Reissued June 24, 1958

24,493

PALLET WITH A COLLAPSIBLE CONTAINER

James M. Phillips, Upper St. Clair Township, Allegheny County, Pa., assignor, by mesne assignments, to Salem-Brosius, Inc., Carnegie, Pa., a corporation of Pennsylvania Original No. 2,756,894, dated July 31, 1956, Serial No. 209,817, February 7, 1951. Application for reissue July 25, 1957, Serial No. 675,240

3 Claims. (Cl. 220—6)

Matter enclosed in heavy brackets [ ] appears in the original patent but forms no part of this reissue specification; matter printed in italics indicates the additions made by reissue.

This invention relates to a pallet with a collapsible container connected therewith. More particularly, the invention relates to a pallet with a collapsible wall container forming part thereof, said pallet being constructed for secure nesting with other containers in either the open or collapsed condition and being adapted to be handled by a forked lifting truck in either the opened or collapsed condition while nested or as a separate unit.

In the mass production of manufactured parts it often happens that the parts may require several operations performed thereon at several machines that are located in widely separated positions in a factory. Further, the parts may be made in large lots and shipped a great distance to a place where the parts are assembled into the finished product.

To avoid the expense and labor of extra handling of the parts, it is desirable to locate a container at the machine where the parts are made, and to load the parts into the container as they issue from the machine. Generally, the containers are quite large and very heavy when loaded so that the containers are usually handled by lifting trucks which have forks adapted to pass under the pallet on which the container rests to pick-up the container.

Such pallets with loaded containers are often loaded into freight cars or trucks, and it is important that the pallets with their containers be nested to economize space. After the containers are emptied they are generally returned to the parts manufacturing factory. The empty containers with their pallets are comparatively light in weight and quite large. It is desirable, therefore, to build the containers as a part of the pallet and to collapse the containers for return shipment. A car loaded with collapsed containers would require the space of many cars if the same number of containers were to be shipped in opened condition.

The primary object of the present invention is to provide a container of rigid construction which forms a part of a pallet, and wherein the container sides are collapsible to form a unit of greatly reduced height.

Another object of the invention is to provide a pallet unit with a collapsible container of such construction that a plurality of units may be nested in a secure pile while the units are in either opened or collapsed condition.

A further object of the invention is to provide a unit consisting of a pallet with a container of such construction that the container can be collapsed and a plurality of units stacked in a secure pile wherein one or a plurality of units may be easily handled by a lifting truck from a stack of assembled units.

A still further object of the invention is to provide a pallet with container sides which may be collapsed to make a pallet unit of greatly reduced cubical volume wherein one of the collapsible container sides has a gate through which the contents of an opened container may be discharged.

With these and other objects in view, the invention consists in the pallet having a container connected therewith as hereinafter described and particularly defined in the appended claims.

The various features of the invention are illustrated in the accompanying drawings, in which.

Figure 1:
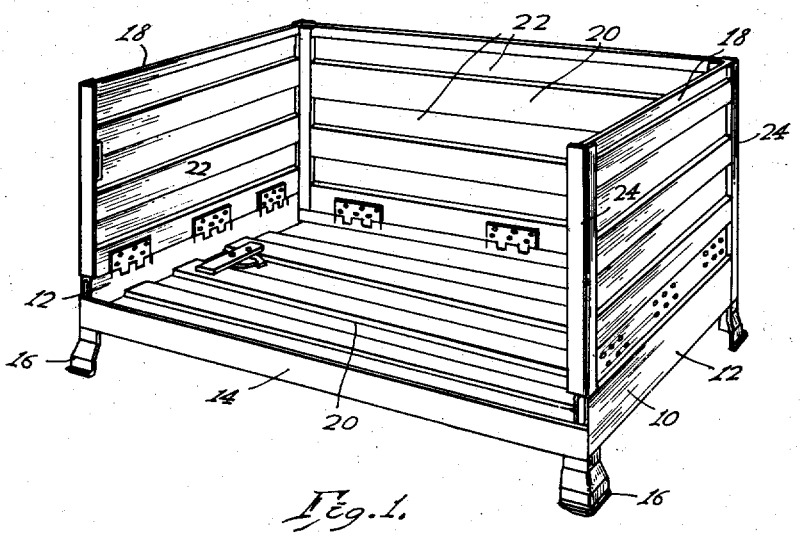
Fig. 1 is a perspective view of a unit consisting of a pallet with a container attached thereto with one side wall of the container shown in collapsed condition.

The unit consisting of a pallet base and a container attached thereto is shown more particularly in Fig. 1. The unit consists of a pallet 10 having a floor surrounded by end flanges 12 and side flanges 14. Legs 16 are attached to each corner of the pallet. The container consists of end walls 18 and side walls 20 which are connected to the flanges 12 and 14 respectively by means of hinges. As illustrated in Fig. 1, the upper leaves of the hinges are connected to the bottoms of the end and side walls, and the lower leaves of the hinges are welded to the flanges 12 and 14. The flanges 14 extend upwardly above the floor of the pallet a sufficient distance so that the side walls 20 may be folded down upon the top of the floor, and the top of the side walls when folded down will not extend a substantial distance above the top of the flanges 14. This arrangement is illustrated more particularly in Fig. 7. The flanges 12 are higher than the flanges 14 and arranged so that the end walls will be folded down to rest upon and enclose the side walls when all of the walls are in collapsed position as illustrated in Fig. 7.

The pallet floor and the end and side walls are each made from a single sheet of steel which preferably is bent and pressed in order to form corrugations or ribs 22 for the purpose of strengthening these parts. The corrugations increase the overall thickness of the walls and pallet floor so that the flanges 12 and 14 are designed to include the thickness of the corrugated walls.

Figure 4:
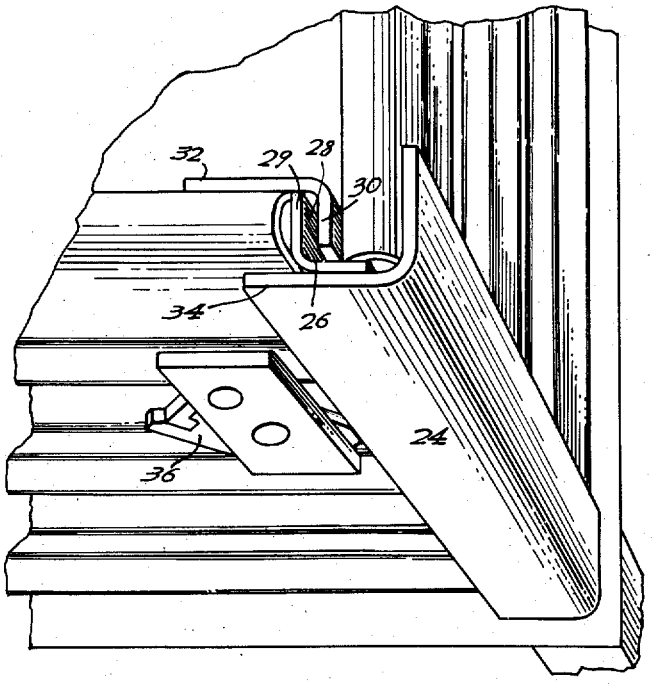
Fig. 4 is a perspective detailed view of a corner of the container when in opened position.
Figure 7:
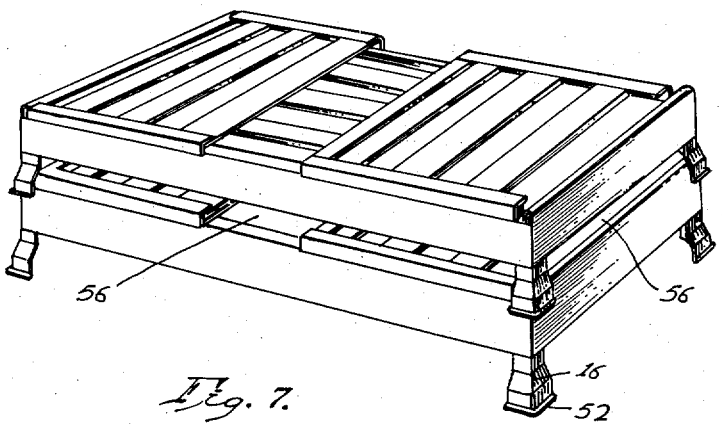
Fig. 7 is a perspective view showing two units in stacked position with a container side and end walls collapsed.
Figure 8:
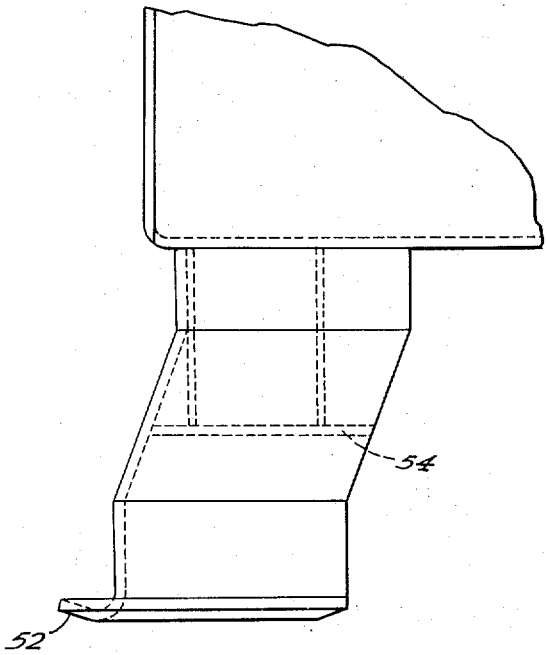
Fig. 8 is a detailed view in elevation of a pallet leg.

The construction of the end walls 18 is shown more particularly in Figs. 1, 4 and 7. The main wall sheet 18 has angle irons 24 at each end. One side of the angle iron is welded to the outer side of the wall and the other side extends beyond the inner face of the wall. A smaller angle 26 is welded within the angle 24 to leave a gap 28 arranged between an inwardly extending flange 29, and the back face of the wall to receive a flange 30 of an angle iron 32 which is secured to a side wall 20. A portion of the wall of the angle 24 extends beyond the point of attachment of the angle 26 to leave a protruding flange 34 which is positioned to rest upon the top of a flange 14 when the wall 18 is folded down into collapsed position.

The lower ends of the angle irons 24 extend only to the top of the flanges 12 (Figs. 1 and 2) and thus leaves a gap at the bottom of the side wall of the angle 24 above the flange 14 which will allow the angle 24 to be moved downwardly so that the edge of the flange 34 will rest upon the top of the flange 14. The space behind the flange 34 between its outer edge and the flange 29 of the angle 26 provides a space so that a side wall in collapsed position may extend above the plane of the upper edge of the flanges 14 when the end walls are folded down to collapsed position. It will be seen that when the end walls are folded down upon the side walls that the walls will be nested and supported throughout substantially their entire length.

Figure 2:
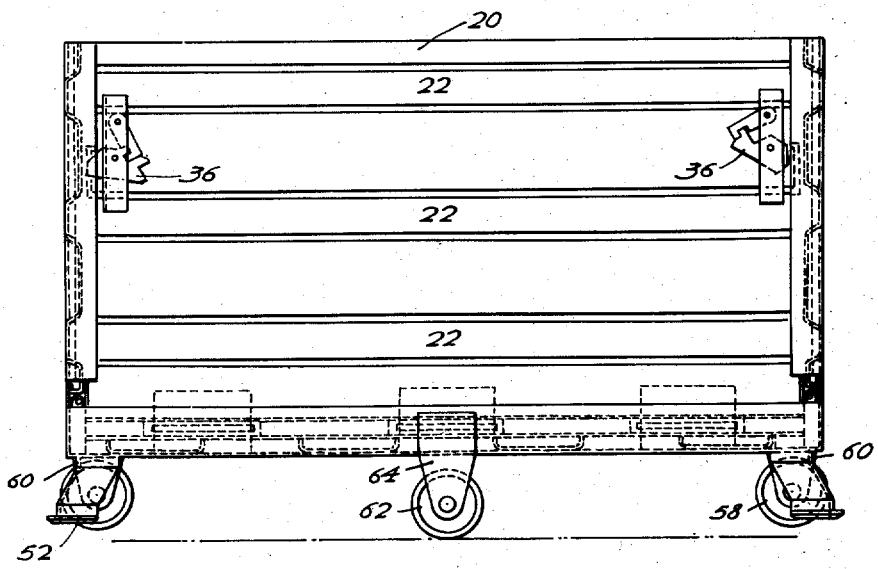
Fig. 2 is a side elevation of a pallet with a container showing more particularly the hinged construction of the side wall and the latches for locking the side wall in opened position.

The construction of the side walls is shown more particularly in Figs. 1, 2 and 4. The side wall plates 20 have the angles 32 welded thereto so that the flange 30 projects beyond the end of the wall a sufficient distance to extend into the gap 28. The nesting of the flanges 29 and 30 is illustrated more particularly in Fig. 4 and shows that when the flange 30 is extended into the gap 28, the end wall will be held from movement either inwardly or outwardly. If the container is in collapsed position as illustrated in Fig. 7, it is necessary to first fold the end walls upwardly and then fold the side walls upwardly to bring the flanges 26 and 30 into interlocking relation with one another. When the flanges of the end and side walls enter interlocking engagement, the side walls may be locked against movement either inwardly or outwardly by means of latches 36.

Figure 5:
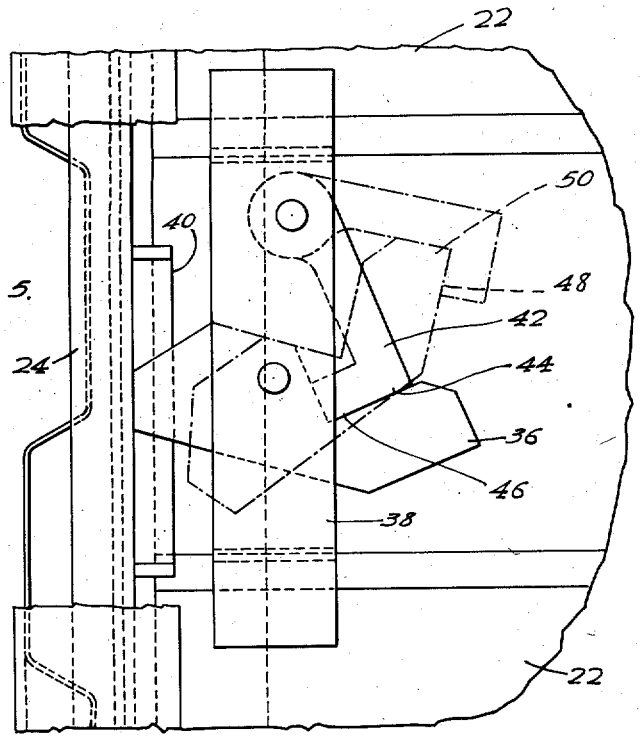
Fig. 5 is a side elevation showing the details of the latch as applied to the side wall of a container.
Figure 6:
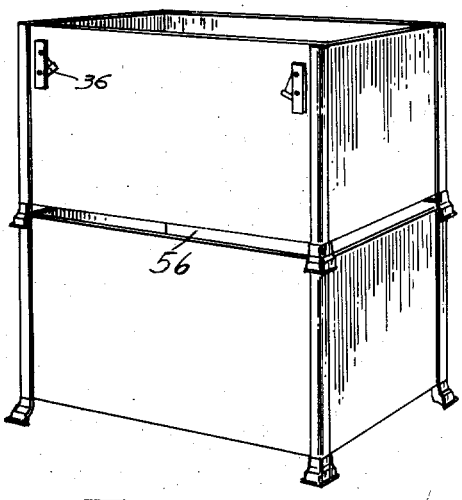
Fig. 6 is a perspective view diagrammatically illustrating two units in stacked position with the container's side and end walls opened.

The construction of the latches is illustrated more particularly in Fig. 5. The latch 36 is rotatably mounted in a plate 38 which in turn is welded to ribs 22 near each edge of the side wall, thus allowing the latches 36 to be contained within the space between the ribs 22. When the side walls are in full opened position, as illustrated in Figs. 2, 4 and 6, the latch is arranged to move into a position behind the angle 24 of the end wall and within a staple plate 40 secured to the inside wall of the angle 24. The latch 36 may be held in opened or closed position by means of a pawl 42 which is hinged to the plate 38 above the latch. When the latch is in closed position a face 44 on the end of the [latch] *pawl* engages a face 46 on the latch as illustrated in full lines in Fig. 5. When the latch is moved to opened position as illustrated in dot-and-dash lines in Fig. 5, a face 48 on the pawl 42 engages a corner 50 on the latch to hold it in open position. Two latches are attached to each side wall near the top to lock the side walls in open position.

An important feature of the present invention consists in the construction of the pallet legs by which a series of pallets may be stacked in a pile and rigidly held in a definite position in a stacked pile. The legs 16 consist of angular members having a floor flange 52 formed at the bottom of the legs to provide an extended surface upon which the pallet and container nests. The angular legs 16 have their lower ends offset from the main body of the leg so that the angular offset portion of the leg will fit over the top corners of a container placed under the legs such as illustrated in Fig. 6. Triangular rest plates 54 are welded within the angle of the legs in a position above the flanges 52 a sufficient distance to allow a substantial portion of the leg to move down across the corners of the next lower container to form a rigid connection within the corner and thus prevent the stacked containers from being misplaced one from the other. The rest plates 54 are spaced a sufficient distance below the bottom of the floor of the pallet so that when the pallets and containers are stacked, a space or opening 56 is formed between the bottom of a pallet and the top of the container so that the forks of a lift truck can readily enter the space for the purpose of lifting the container or all containers in the stack above the space into which the lift truck fork enters. The space 56 extends entirely around the stacked pallets and containers, so that the lift truck can enter from either side or either end of the pallet and container.

When the opened containers are stacked as illustrated in Fig. 6, the rest plates 54 extend across the corners of the container and rest upon the top of a side and an end wall. When the collapsed containers are stacked, the rest plates 54 extend from the angle 24 at the side of an end plate across to the top of an end flange 14.

By comparison of the stacked containers illustrated in Figs. 6 and 7, it will be seen that the collapsed container contains a much smaller cubical content than the open containers. Therefore, a large number of empty containers may be stacked and handled with lift trucks, to be placed in cars or trucks for shipment.

Figure 3:
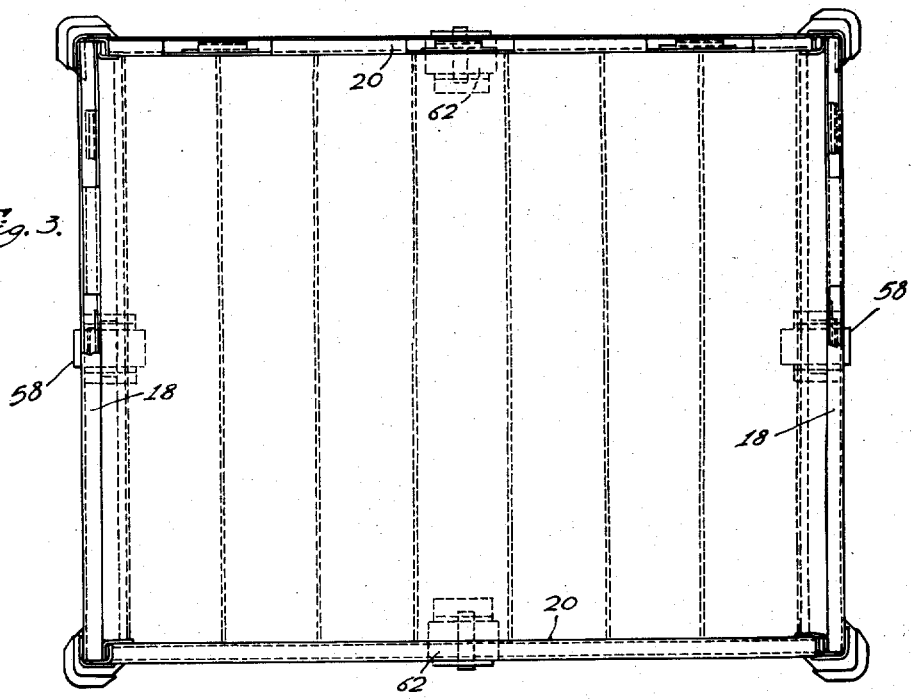
Fig. 3 is a top plan view of the unit shown in Fig. 1 when looking down into an opened container.

In Figs. 2 and 3 is shown a modified form of pallet and container unit from that shown in Fig. 1, in that rollers are mounted on the bottom of the pallet so that the unit may be moved about on the rollers. Rollers 58 are mounted in the middle portion of each of the ends and attached to the flanges 12 at the ends of the pallet. The brackets 60 for supporting the rollers 58 are mounted on the bottom of the pallet and the flange 12, so that when the pallet units are stacked, such as shown in Fig. 6, the rollers 58 will extend inside of the flanges 12 and allow the legs on the bottom of the pallet to rest upon the rest plates 54. Rolls 62 are mounted on the flanges 14 below the centers of the sides 20 with brackets 64 offset and arranged so that the rolls 62 will extend inside of the flanges 14 when the pallet units are stacked. As shown in Fig. 2, the brackets 64 for supporting the rolls 62 are longer than the brackets 60 above the ends of the unit, so that the entire weight of the pallet unit may be taken by the rolls 62 to allow the unit to be turned around in a short space. When the unit is turned around on the rolls 62, the rolls 58 are held above the floor level. When the unit is moved in a direction longitudinally of the unit, the weight of the unit is preferably held on the rolls 62 and one of the end rolls 58.

Figure 9:
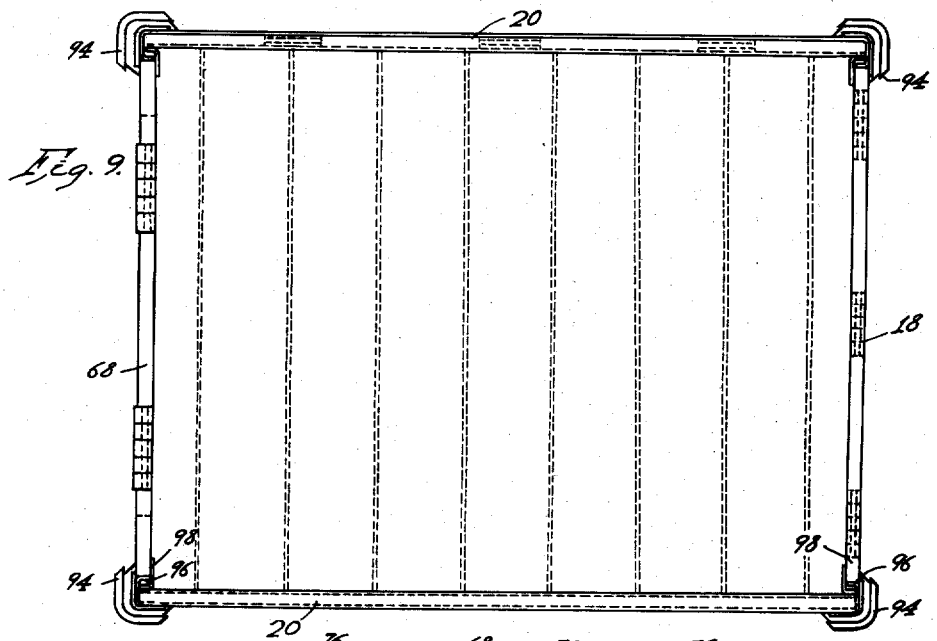
Fig. 9 is a plan view of a modified form of a unit having an end discharge gate.
Figure 10:
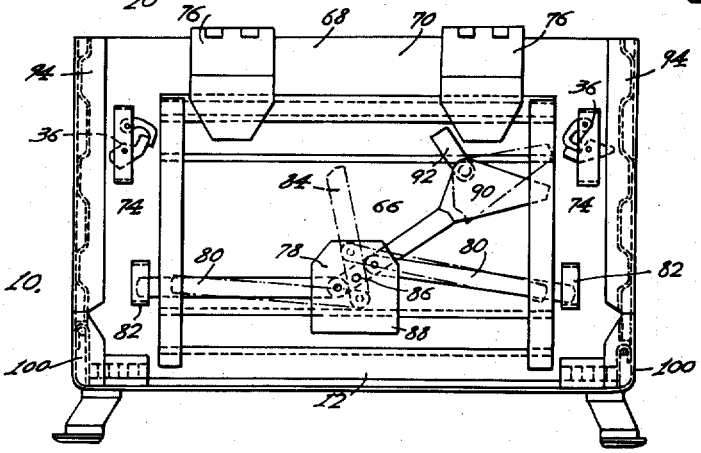
Fig. 10 is a view in front elevation of the end of a unit containing the discharge gate.
Figure 11:
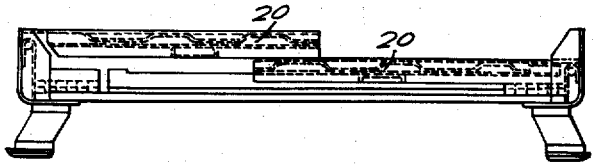
Fig. 11 is a view in front elevation showing the unit of Fig. 9 in collapsed condition.

In Figs. 9, 10 and 11 is shown a modified form of pallet and collapsible container unit in which an end gate is mounted so that the articles which may be loaded into the container may be removed from the container by tilting the unit to allow the articles to run out through the gate. The gate 66 is mounted in an end wall 68, this wall being hinged to the pallet in the same way that the end walls 18 are hinged. The end wall 68 consists of horizontal members 70 and 72 which are connected by side members 74. The members 70, 72 and 74 bound an opening which is covered by the gate 66. The gate is held in position by hinges 76 which are connected to the top wall 70 which will permit the gate to be swung upwardly and back over the top of the container. The gate is normally held in the wall 68 in locked position by means of a latch 78 which is composed of locking arms 80 and staples 82. The staples 82 are secured by welding to the side member 74 of the end 68, and the arms 80 are pivotally connected with a lever 84 which in turn is pivoted at 86 to a plate 88 attached to the gate 66. When the hand lever is turned to the position shown in full lines (Fig. 10), the arms 80 are moved into the staples 82 to lock the gate in position. When the handle is moved into the position shown in dotted lines, the arms 80 are withdrawn from the staples 82 so that the door may be moved out of the opening in the end of the unit. A detent 90 having an arm 92 is pivoted to the front face of the gate and can be moved into position shown in dotted lines (Fig. 10) to permit the handle 84 to be moved for opening and closing the latch. When the latch is in the position shown in full lines, the detent can be moved into the position shown in full lines to positively hold the latch in locking position. Latches 36 are mounted on the end 68 which have the same construction as that described above to hold the end 68 in open position.

In order to permit the walls of the unit to be moved into collapsed position with the construction shown in Figs.

9, 10 and 11, it is necessary that the locking flanges between the end and side walls should be the reverse of the construction shown in Fig. 4. To accomplish this, angles 94 are secured to the side walls 20 with an angular flange 96 welded to the inner face to provide an opening into which a flanged member 98, which is secured to the end walls 18 and 68, may enter. This type of construction is used at each corner of the container and makes it necessary for the end walls 18 and 68 to be moved downwardly into contact with the top of the pallet before the side walls 20 are moved down into contact with the top of the end walls. The collapsed position of the end and side walls is shown more particularly in Fig. 11. Since the height of the side walls is more than half the width of the pallet, the side walls overlap when in collapsed position, and accordingly it is necessary to form a lower section 100 of the angle 94 to support the flanges 14 at each side of the unit. The top of the angles 100 is substantially in a plane with the top of a side wall 20 when it is in collapsed position, and this constitutes the top of the unit when the side walls are collapsed. If desired, rollers such as illustrated in Figs. 2 and 3 may be mounted on the bottom of the unit shown in Figs. 9, 10 and 11, to provide a construction by which the unit may be rolled from position to position. Ordinarily the units are moved from place to place with a forked lifting truck so that rollers are not mounted on the bottoms of the units.

The preferred form of the invention having been thus described, what is claimed as new is:

I claim:

*1.* A collapsible container comprising a base having a floor, side and end flanges projecting above the floor with the end flanges higher than the side flanges, side walls pivotally connected with said base side flanges for folding inwardly across the floor, said side walls in folded position being within the horizontal plane of the end wall flanges, end walls of a width less than the spacing of the base side flanges and pivotally connected to the base end flanges for folding down upon the side walls, side flanges on each end wall terminating above the base end flange and overlapping the adjacent portion of each side wall and in alignment with the base side flange when the walls are in erected position, a member mounted on the inner face of each side wall at each end thereof overlapping each adjacent end wall flange in spaced relation thereto, an inturned flange on each side wall member terminating short of the end wall flange, and forming a stop for inward movement of the end wall in erected position, a stop member mounted on the end wall flange and disposed behind the side wall member flange resisting outward movement of the end wall in erected position, and a latch member mounted on each side wall adjacent each end wall flange for selective engagement therewith to retain the container walls in erected position.

*2. A collapsible container comprising a base having a floor, flange means including side and end flanges projecting above the floor with the end flanges higher than the side flanges, side walls pivotally connected with the flange means for folding inwardly across the floor, said side walls in folded position being within the horizontal plane of the end wall flanges, end walls of a width less than the spacing of the base side flanges and pivotally connected to the base end flanges for folding down upon the side walls, side members on each end wall terminating above the base end flange and in alignment with the base side flange when the walls are in erected position, a member mounted on the inner face of each side wall at each end thereof overlapping each adjacent end wall side member, an inturned flange on each side wall member forming a stop for inward movement of the end wall in erected position and a stop portion on each end wall side member and disposed behind the side wall member flange resisting outward movement of the end wall in erected position, and a latch member mounted on the outside of each side wall adjacent each end wall side member for selective engagement with such side member to retain the container walls in erected position.*

*3. A collapsible container comprising a generally rectangular base having a floor, flanges adjacent the edges of the base projecting above the floor with one pair of opposed flanges higher than the other pair of opposed flanges, walls pivotally connected with the flanges for folding inwardly across the floor, one pair of opposed walls in folded position being within the horizontal plane of the first mentioned pair of opposed flanges, the other pair of opposed walls being of a width less than the spacing of the second mentioned pair of opposed flanges for folding down upon the first mentioned pair of opposed walls, side members on each of the walls of the second mentioned pair of opposed walls terminating above the corresponding respective flanges with which the walls are respectively pivotally connected and in alignment with the other two flanges respectively when the walls are in erected position, a member mounted on the inner face of each of the walls of the first mentioned pair of opposed walls at each end thereof overlapping each adjacent wall of the second mentioned pair of opposed walls, an inturned flange on each such member forming a stop for inward movement of the wall of the second mentioned pair of opposed walls with which it cooperates in erected position and a stop on each of said side members and disposed behind the cooperating inturned flange resisting outward movement of the wall carrying that stop in erected position, and a latch member mounted on the outside of each wall of the first mentioned pair adjacent the side member of the corresponding wall of the second mentioned pair for selective engagement with such side member to retain the container walls in erected position.*

References Cited in the file of this patent or the original patent

UNITED STATES PATENTS

| | | |
|---|---|---|
| 299,844 | Painer | June 3, 1884 |
| 718,412 | Bach et al. | Jan. 13, 1903 |
| 915,704 | Scott et al. | Mar. 16, 1909 |
| 1,063,424 | Fosh | June 3, 1913 |
| 1,196,391 | Parker et al. | Aug. 29, 1916 |
| 1,369,704 | Parker | Feb. 22, 1921 |
| 1,573,889 | Wiser et al. | Feb. 23, 1926 |
| 1,626,369 | Williamson | Apr. 26, 1927 |
| 1,856,611 | Woodruff | May 3, 1932 |
| 1,879,214 | Hallowell et al. | Sept. 27, 1932 |
| 1,884,636 | Faus | Oct. 25, 1932 |
| 1,967,506 | Harrison | July 24, 1934 |
| 2,070,070 | Stoner | Feb. 9, 1937 |
| 2,201,533 | Goldman | May 21, 1940 |
| 2,231,619 | Fenton | Feb. 11, 1941 |
| 2,239,611 | Larin et al. | Apr. 22, 1941 |
| 2,452,356 | Coit | Oct. 26, 1948 |
| 2,503,208 | Nydegger et al. | Apr. 4, 1950 |
| 2,517,178 | Cheatham | Aug. 1, 1950 |
| 2,622,830 | Coit | Dec. 23, 1952 |
| 2,630,924 | Vacanti | Mar. 10, 1953 |
| 2,658,647 | Stoner | Nov. 10, 1953 |

FOREIGN PATENTS

| | | |
|---|---|---|
| 874,262 | France | Apr. 27, 1942 |

OTHER REFERENCES

Catalog, page 7, Turner System of Material Handling, Factory Service Co., 4615 N. Twenty-first Street, Milwaukee 9, Wisconsin. (Copy in Pallet Digest.)